(12) United States Patent
Shiratori et al.

(10) Patent No.: US 6,344,621 B1
(45) Date of Patent: Feb. 5, 2002

(54) SWITCH MOUNTING STRUCTURE

(75) Inventors: Toshihiko Shiratori; Hiroshi Sakamoto; Masazumi Igarashi, all of Saitama (JP)

(73) Assignee: Toyo Denso Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/975,106

(22) Filed: Nov. 20, 1997

(51) Int. Cl.[7] .................................................. H01H 9/00
(52) U.S. Cl. ............................... 200/61.54; 200/61.27; 200/296
(58) Field of Search ............................... 200/1 R, 5 R, 200/51 R, 51.02–51.06, 51.11–51.13, 61.54–61.57, 293, 295, 296, 303, 307, 329, 339, 341; 439/76.1, 206, 519, 521, 620

(56) References Cited

U.S. PATENT DOCUMENTS

| | | | | |
|---|---|---|---|---|
| 4,095,074 A | * | 6/1978 | Lockard | 200/295 |
| 4,485,282 A | * | 11/1984 | Lee | 200/51 R |
| 4,710,599 A | * | 12/1987 | Motodate et al. | 200/61.85 |
| 4,733,030 A | * | 3/1988 | Erdelitsch et al. | 200/61.54 |
| 5,200,884 A | * | 4/1993 | Ohashi | 361/401 |
| 5,883,348 A | * | 3/1999 | Yokoyama | 200/61.54 |

FOREIGN PATENT DOCUMENTS

JP        5-238463        9/1993

\* cited by examiner

*Primary Examiner*—Michael Friedhofer
(74) *Attorney, Agent, or Firm*—Arent Fox Kintner Plotkin & Kahn, PLLC

(57) ABSTRACT

A switch housing (21) of a starter switch (Ss) is inserted into an opening ($1_4$) defined in a rear handlebar cover (1) in a motor vehicle, and a locking claw ($21_2$) projectingly provided on the switch housing (21) is locked in the opening ($1_4$) to fix the switch housing (21). When the switch housing (21) is inserted into the opening ($1_4$), a leaf spring-like terminal ($24_2$) of a stationary contact (24) exposed to a surface of the switch housing (21) comes into resilient abutment against a terminal ($31_2$) of a bus bar (31) exposed to the opening ($1_4$) in the rear handlebar cover (1), thereby automatically completing the connection of the starter switch (Ss) and the bus bar (31) to each other. Thus, it is possible to simply and reliably perform the operation of mounting the starter switch (Ss) to the rear handlebar cover (1) and the operation of electrically connecting the starter switch (Ss) to the bus bar (31).

3 Claims, 7 Drawing Sheets

SWITCH MOUNTING STRUCTURE

BACKGROUND OF THE INVENTION

1. Field of the Invention

The present invention relates to a switch mounting structure in which a switch is mounted on a switch support and a terminal of the switch is electrically connected to a terminal of a conductor mounted on the switch support.

2. Description of the Related Art

Such a switch mounting structure is known, for example, from Japanese Patent Application Laid-open No.5-238463. In the above structure, a switch mounted to a handlebar of a motorcycle is comprised of a front body connected to a wire harness, and a rear body accommodated in a switch body, and the switch is mounted to the handlebar by fastening both of the bodies by a bolt with the handlebar interposed therebetween. The connection of the switch body and the wire harness is performed by coupling of a female connector provided on the front body and a male connector provided on the rear body.

However, the above known structure suffers from a problem that not only the operation for positioning the front and rear bodies on the handlebar while coupling the female and male connectors is troublesome, but also the number of working steps is further increased, because the fastening by bolt is required for coupling both the bodies to each other.

SUMMARY OF THE INVENTION

Accordingly, it is an object of the present invention to provide a switch mounting structure, wherein the operation of mounting the switch to the switch support and the operation of electrically connecting the switch to the conductor can be simply and reliably performed.

To achieve the above object, according to a first aspect and feature of the present invention, there is provided a switch mounting structure in which a switch is mounted on a switch support and a terminal of the switch is electrically connected to a terminal of a conductor mounted on the switch support, wherein a switch housing is inserted into an opening defined in the switch support and locked by a locking claw, and the terminal of the switch exposed to an outer surface of the switch housing is put into resilient abutment against the terminal of the conductor exposed to the opening.

With the above construction, it is possible to easily and reliably mount the switch housing to the switch support only by inserting the switch housing into the opening defined in the switch support and locking it by the locking claw. In addition, since the terminal of the switch exposed to an outer surface of the switch housing is put into resilient abutment against the terminal provided on the conductor and exposed to the opening, the switch and the conductor can be releasably connected to each other so as to prevent the occurrence of a contact failure.

According to a second aspect and feature of the present invention, in addition to the first feature, the conductor is a bus bar embedded in the switch support.

With the above construction, in addition to the effect provided by the first feature, it is possible to decrease the number of parts and the number of steps required for the wiring, as compared with the case where the wire harness is used. Further, a possibility of occurrence of a short-circuiting, a breaking of wire, a mis-assembling or the like can be decreased, but also the durability of the bus bar used for a long period can be enhanced, as compared with the wire harness.

According to a third aspect and feature of the present invention, in addition to the second feature, the switch support is a handlebar cover which covers a handlebar in a motorcycle.

With the above construction, in addition to the effect provided by the second feature, it is easy to conduct the mounting of the switch to the handlebar cover in the motorcycle and the wiring of the switch.

According to a fourth aspect and feature of the present invention, in addition to the second feature, the switch support is a bus bar-embedded substrate disposed in a handlebar cover which covers a handlebar in a motorcycle.

With the above construction, in addition to the effect provided by the second feature, it is easy to conduct the mounting of the switch to the handlebar cover in the motorcycle and the wiring of the switch, but also it is easy to produce the handlebar cover, leading to a reduced cost.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 illustrate a first embodiment of the present invention, wherein

FIG. 1 is an exploded perspective view taken from the front of a rear handlebar cover in a motorcycle;

FIG. 2 is an enlarged view taken in the direction of an arrow 2 in FIG. 1;

FIG. 3 is a sectional view taken along a line 3—3 in FIG. 2;

FIG. 4 is a sectional view taken along a line 4—4 in FIG. 3;

FIG. 5 is a sectional view taken along a line 5—5 in FIG. 4;

FIG. 6 is an exploded perspective view of a starter switch;

FIG. 7 is a diagram for explaining a wiring provided by bus bars; and

DETAILED DESCRIPTION OF THE PREFERRED EMBODIMENTS

The present invention will now be described by way of embodiments with reference to the accompanying drawings.

A first embodiment of the present invention will be first described with reference to FIGS. 1 to 7.

Figure 1:
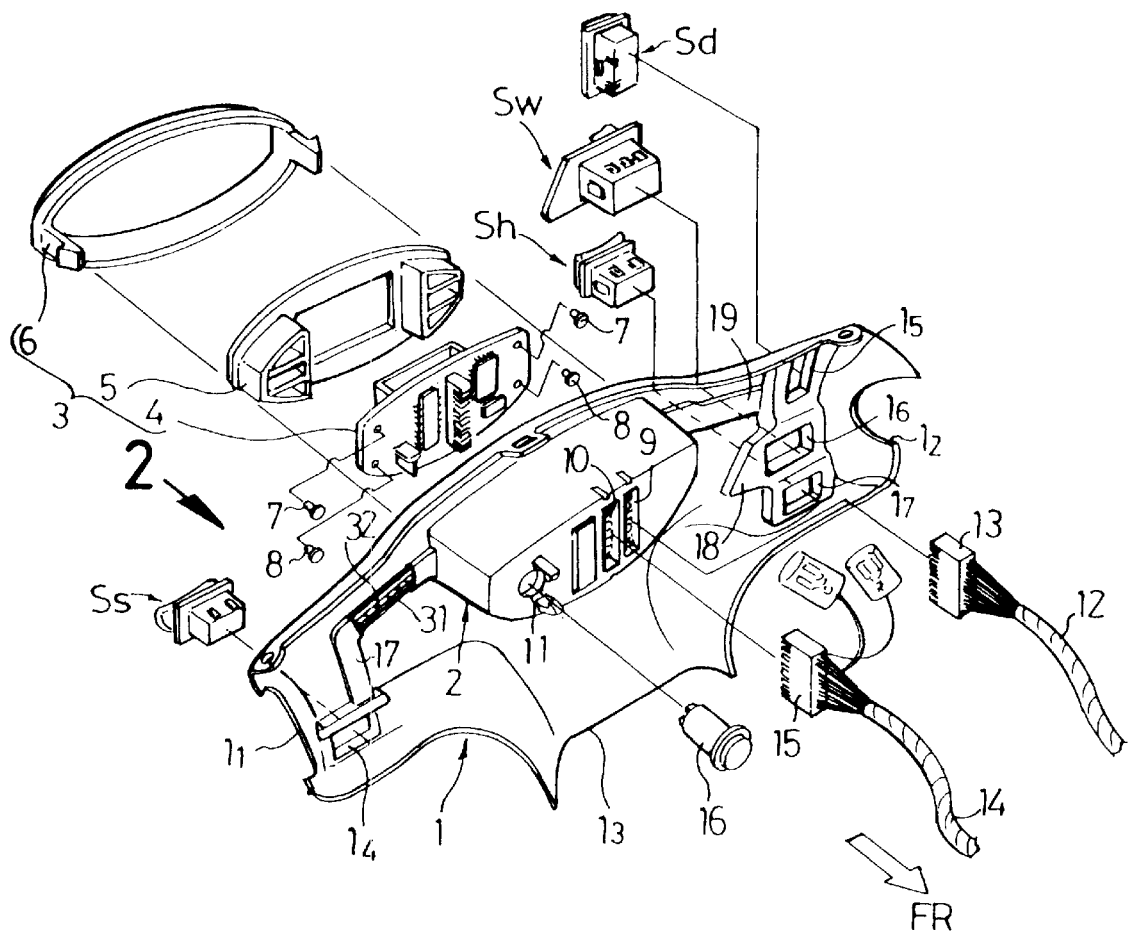
Figure 2:
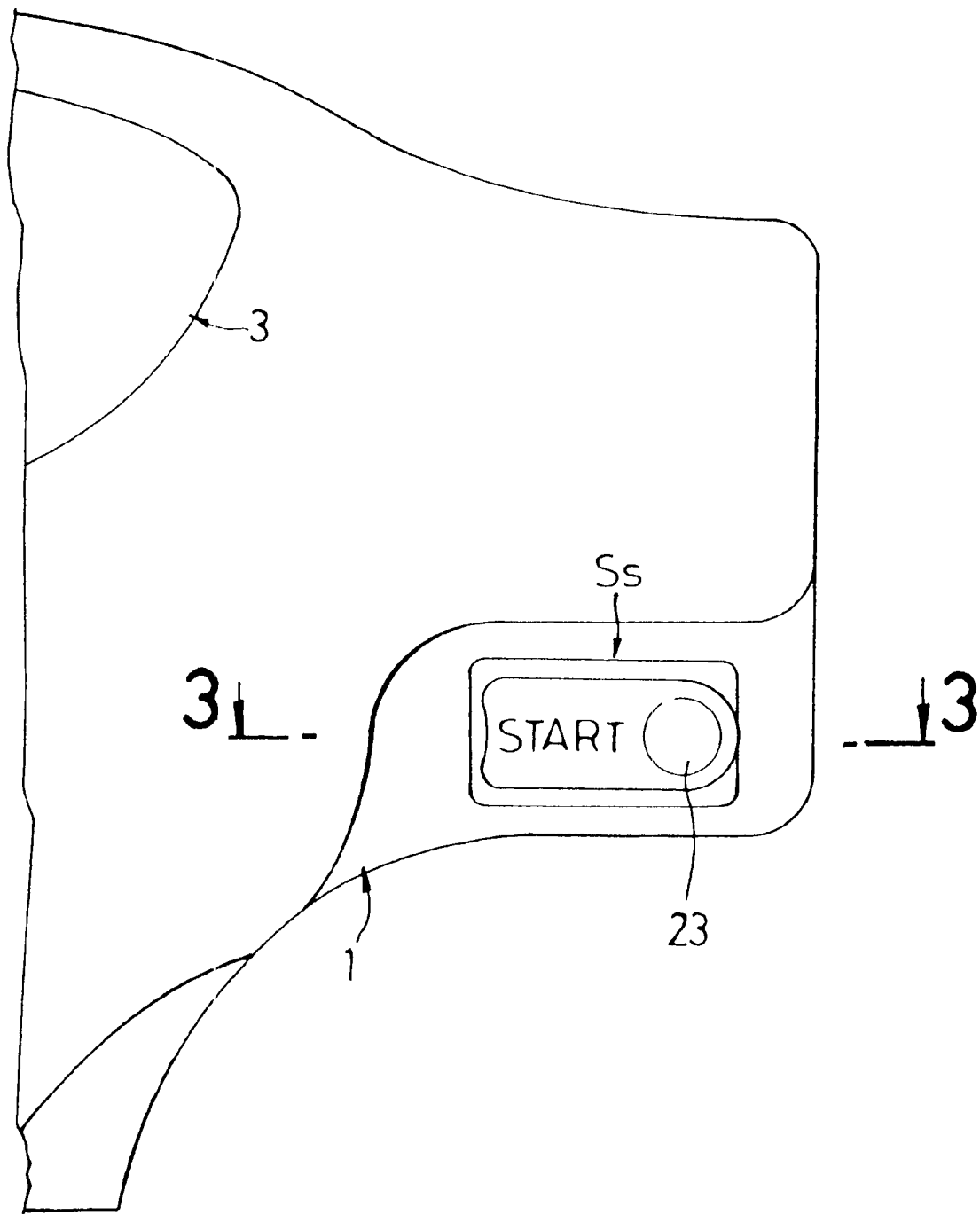
Figure 3:
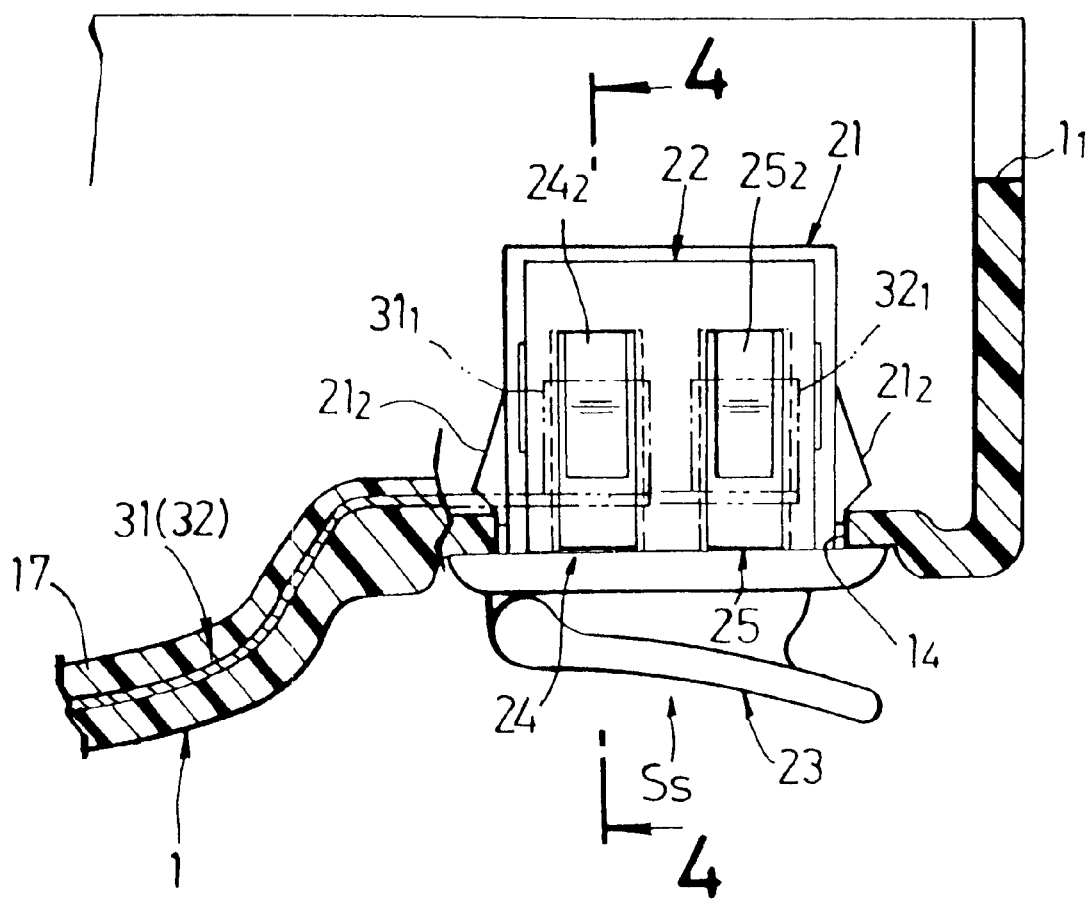
Figure 4:
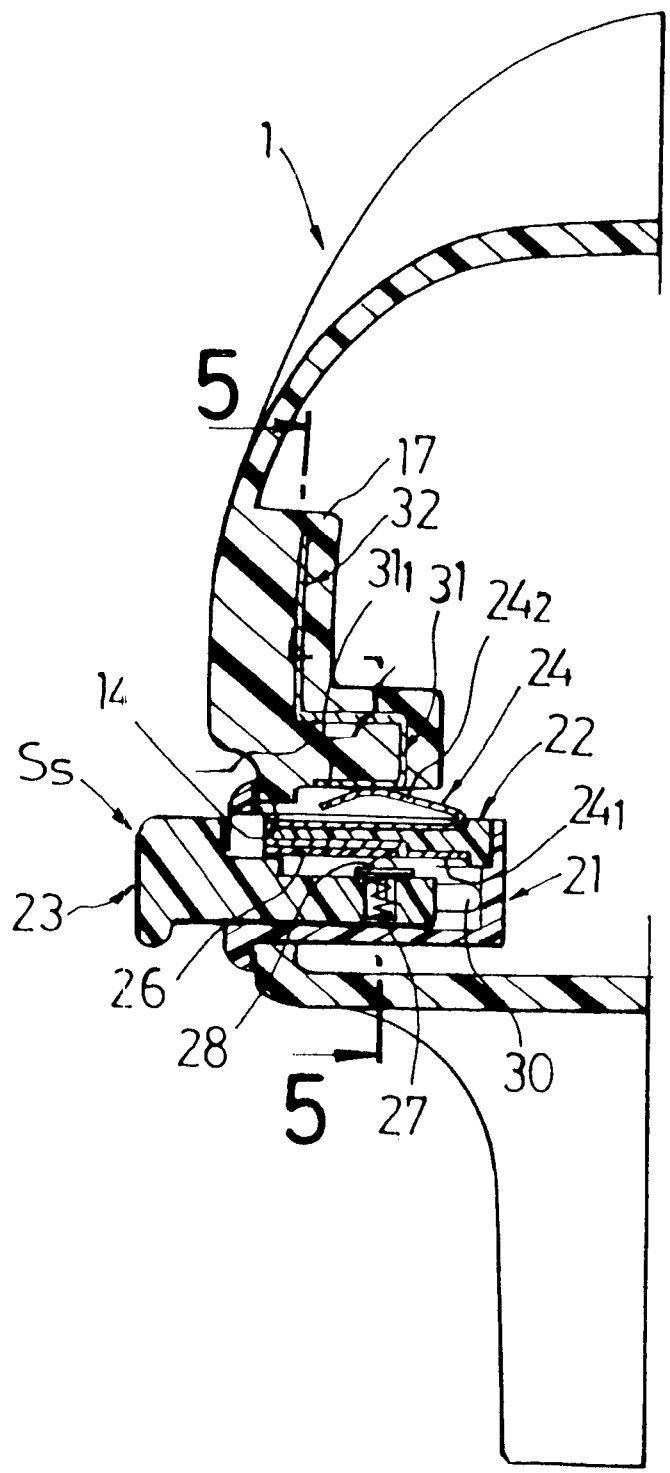
Figure 5:
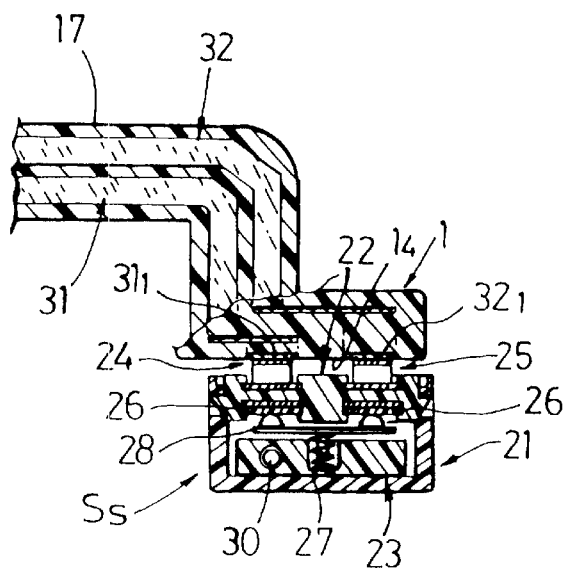
Figure 6:
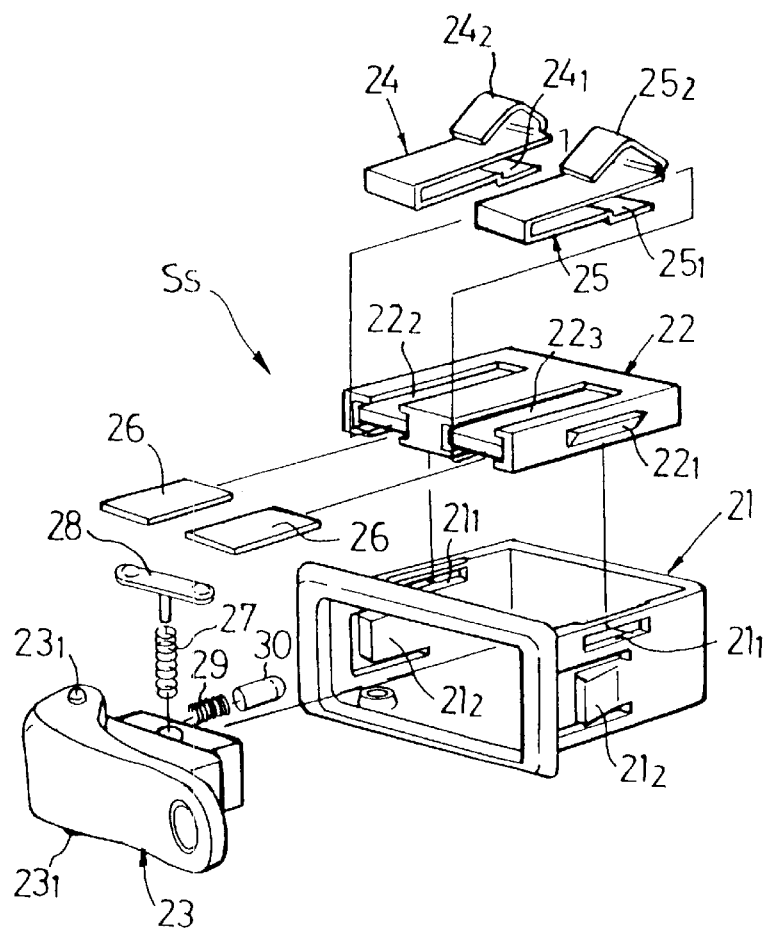
Figure 7:
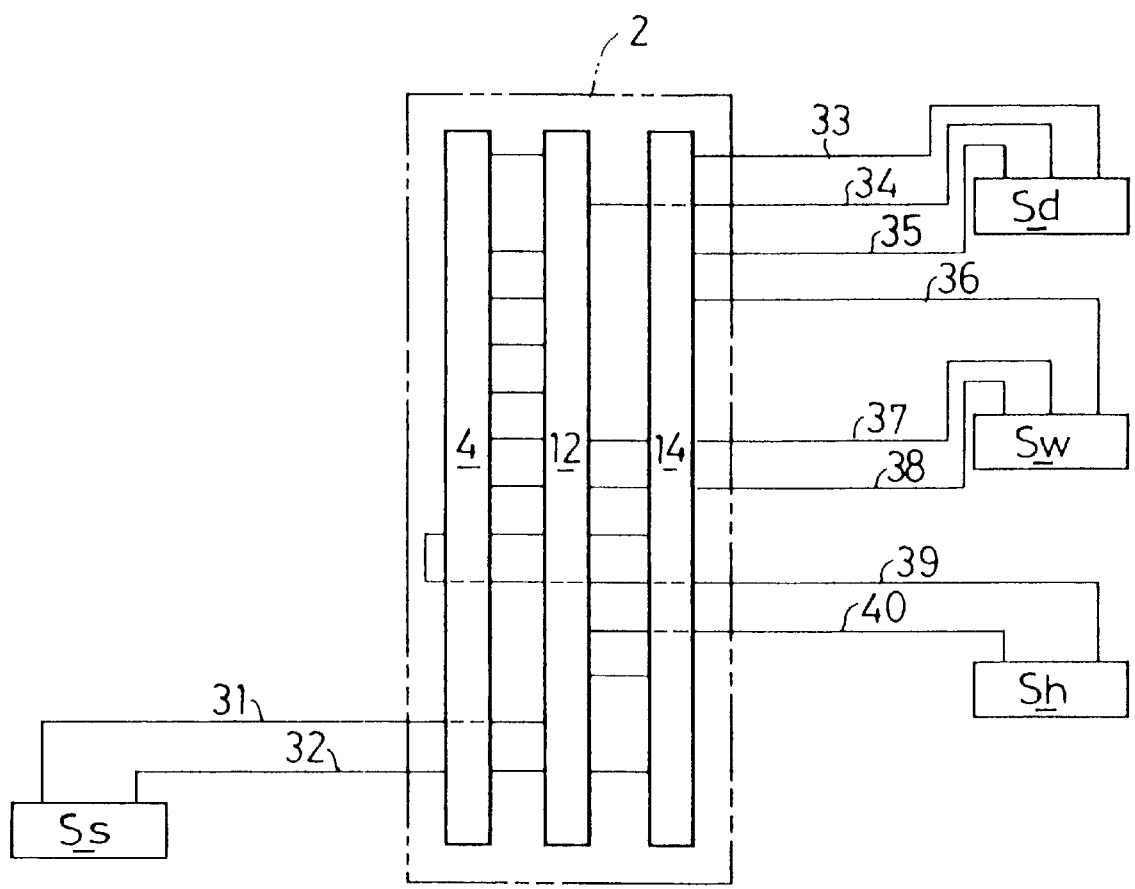

In FIG. 1, reference character 1 is a rear handlebar cover made of a synthetic resin for covering a rear portion of a handlebar of a motorcycle. The handlebar cover 1 has a notch $1_1$ which is defined at a right end thereof as viewed from a rider and through which a right half of the handlebar is passed, a notch $1_2$ which is defined at a left end thereof and through which a left half of the handlebar 1 is passed, and a notch $1_3$ which is a lower end thereof and through which a steering shaft is passed. A junction box 2 is integrally formed at a central portion of the rear handlebar cover 1 to protrude a forwards of a vehicle body, and a meter unit 3 is mounted to the junction box 2 from the rearward of the vehicle body. The meter unit 3 is comprised of a meter body 4 including a print board having electronic parts such as IC and a liquid crystal display mounted therein, a meter indicating plate 5 and a mater lens 6. A pair of left and right turn-signal bulbs 7, 7 and a pair of left and right illuminating bulbs 8, 8 are mounted in the meter body 4.

Three connectors 9, 10 and 11 are mounted in a front surface of the junction box 2. A connector 13 of a main harness 12 connected to a battery or a starter motor mounted on the vehicle body is coupled to the connector 9. A connector 15 of a front handlebar cover harness 14 connected to a head light or winker lamp in a front handlebar cover mounted to the front surface of the rear handlebar cover 1 is coupled to the connector 10. A winker relay 16 is coupled to the connector 11.

A starter switch Ss is mounted in an opening $1_4$ defined in a right portion of the rear handlebar cover 1. A first bus bar embedding substrate 17 is projectingly provided in a band-like shape on an inner surface of the rear handlebar cover 1 to connect the opening $1_4$ in the starter switch Ss and the junction box 2 to each other. Three openings $1_5$, $1_6$ and $1_7$ for mounting of a dimmer switch Sd, a winker switch Sw and a horn switch Sh are defined in a left portion of the rear handlebar cover 1. A second bus bar embedding substrate 18 is projectingly provided on the inner surface of the rear handlebar cover 1 to surround the three openings $1_5$, $1_6$ and $1_7$. Further, a third bus bar embedding substrate 19 is projectingly provided on the inner surface of the rear handlebar cover 1 to connect the second bus bar embedding substrate 18 and the junction box 2. A plurality of bus bars which will be described hereinafter are embedded in each of the bus bar embedding substrates 17, 18 and 19. The starter switch Ss, the dimmer switch Sd, the winker switch Sw and the horn switch Sh are connected to the inside of the junction box 2 through these bus bars.

The structures of the starter switch Ss and the bus. bars will be described below with reference to FIGS. 2 to 6.

The starter switch Ss includes a switch housing 21 which opens at its upper and front surfaces. A contact holder 22 is fitted in an opening in the upper surface of the switch housing 21 and fixed by bringing projections $22_1$, $22_1$ provided on a side of the contact holder 22 into engagement in locking bores $21_1$, $21_1$ in the switch housing 21. A switch lever 23 is fitted into an opening in the front surface of the switch housing 21 and swingably supported by bringing a pair of upper and lower pins $23_1$, $23_1$ projectingly provided at one end of the switch lever 23 into engagement with the switch housing 21 and the contact holder 23, so that the switch lever 23 can be swung about the pins $23_1$, $23_1$.

A pair of stationary contacts 24 and 25 made by bending a metal plate are fitted into a pair of contact support portions $22_2$ and $22_3$ formed in the contact holder 22. A portion of a lower surface of each of the stationary contacts 24 and 25 is covered with each of plate-like insulators 26, 26, with contact portions $24_1$ and $25_1$ of the stationary contacts 24 and 25 being exposed in turned-down states at locations adjoining the insulators 26, 26. A movable contact 28 biased upwards by a spring 27 is vertically slidably carried on an upper surface of the switch lever 23. The movable contact 28 is slidable over the insulators 26, 26 and the contact portions $24_1$ and $25_1$. A pin 30 biased forwards by a spring 29 protrudes for advancing and retreating movements from a back of the switch lever 23, so that a tip end of the pin 30 resiliently abuts against the inner surface of the switch housing 21. The resilient force of the spring 29 acts to push back the other end of the switch lever 23.

Therefore, when the other end of the switch lever 23 is urged in order to turn ON the starter switch Ss, the movable contact 28 mounted on the switch lever 23 is moved from on the insulators 26, 26 onto the pair of contact portions $24_1$ and $25_1$ of the stationary contacts 24 and 25 to allow the pair of contact portions $24_1$ and $25_1$ to conduct. When the urging of the other end of the switch lever 23 is released, the switch lever 23 is automatically restored to an OFF position by the resilient force of the spring 29.

Two bus bars 31 and 32 made of a band-like metal plate are embedded in the first bus bar embedding substrate 17 (see FIG. 1). The bus bars 31 and 32 are incorporated in the rear handlebar cover 1 when the rear handlebar cover 1 is produced by an injection molding. Terminals $31_1$ and $32_1$ formed at one ends of the bus bars 31 and 32 are exposed in the vicinity of the opening $1_4$ in the rear handlebar cover 1. Terminals $24_2$ and $25_2$ having a resilience and formed by folding the stationary contacts 24 and 25 of the starter switch Ss abut against the terminals $31_1$ and $32_1$.

When the starter switch Ss is inserted into the opening $1_4$ in the rear handlebar cover 1, two locking claws $21_2$, $21_2$ formed on the switch housing 21 are engaged with edges of the openings $1_4$, whereby the starter switch Ss is fixed to the rear handlebar cover 1 and at the same time, the connection of the starter switch Ss and the bus bars 31 and 32 is automatically completed. Moreover, a reliable electric conduction is ensured by the resilience of the terminals $24_2$ and $25_2$. In this way, means such as a bolt, a connector, a soldering and the like is not used for fixing and wiring of the starter switch Ss, and hence, it is possible to reduced the number of parts and the number of assembling steps.

Each of the dimmer switch Sd, the winker switch Sw and the horn switch Sh also is mounted to the rear handlebar cover 1 in a structure similar to that of the starter switch Ss. A plurality of bus bars for connecting each of the dimmer switch Sd, the winker switch Sw and the horn switch Sh to the junction box 2 are also embedded in each of the second and third bus bar embedding substrates 18 and 19. More specifically, as can be seen from FIG. 7, the two bus bars 31 and 32 extending from the starter switch Ss, three bus bars 33, 34 and 35 extending from the dimmer switch Sd, three bus bars 36, 37 and 38 extending from the winker switch Sw and two bus bars 39 and 40 extending from the horn switch Sh are connected to the meter body 4, the main harness 12 and the front handlebar harness 14 in the junction box 2.

In the above manner, the wiring to the electric parts including the starter switch Ss, the dimmer switch Sd, the winker switch Sw and the horn switch Sh mounted to the rear handlebar cover 1 of the motorcycle is performed by the bus bars 31 to 40 embedded in the rear handlebar cover 1. Therefore, as compared with the case where the conventional wire harnesses are used, it is possible not only to substantially reduce the numbers of parts and steps required for the wiring, but also to decrease the possibility of occurrence of a short-circuiting, breaking, mis-assembling and the like. Moreover, it is possible to enhance the durability of the bus bars used for a long period, as compared with the wire harnesses. Further, since the junction box 2 is mounted on the mounting portion for the meter unit 3 located at the central section of the rear handlebar cover 1, and the bus bars 31 to 40 are disposed radiately about the junction box 2, it is possible to suppress the entire length of the bus bars 31 to 40 to the minimum, while avoiding the mutual interference of the bus bars 31 to 40.

Figure 8:
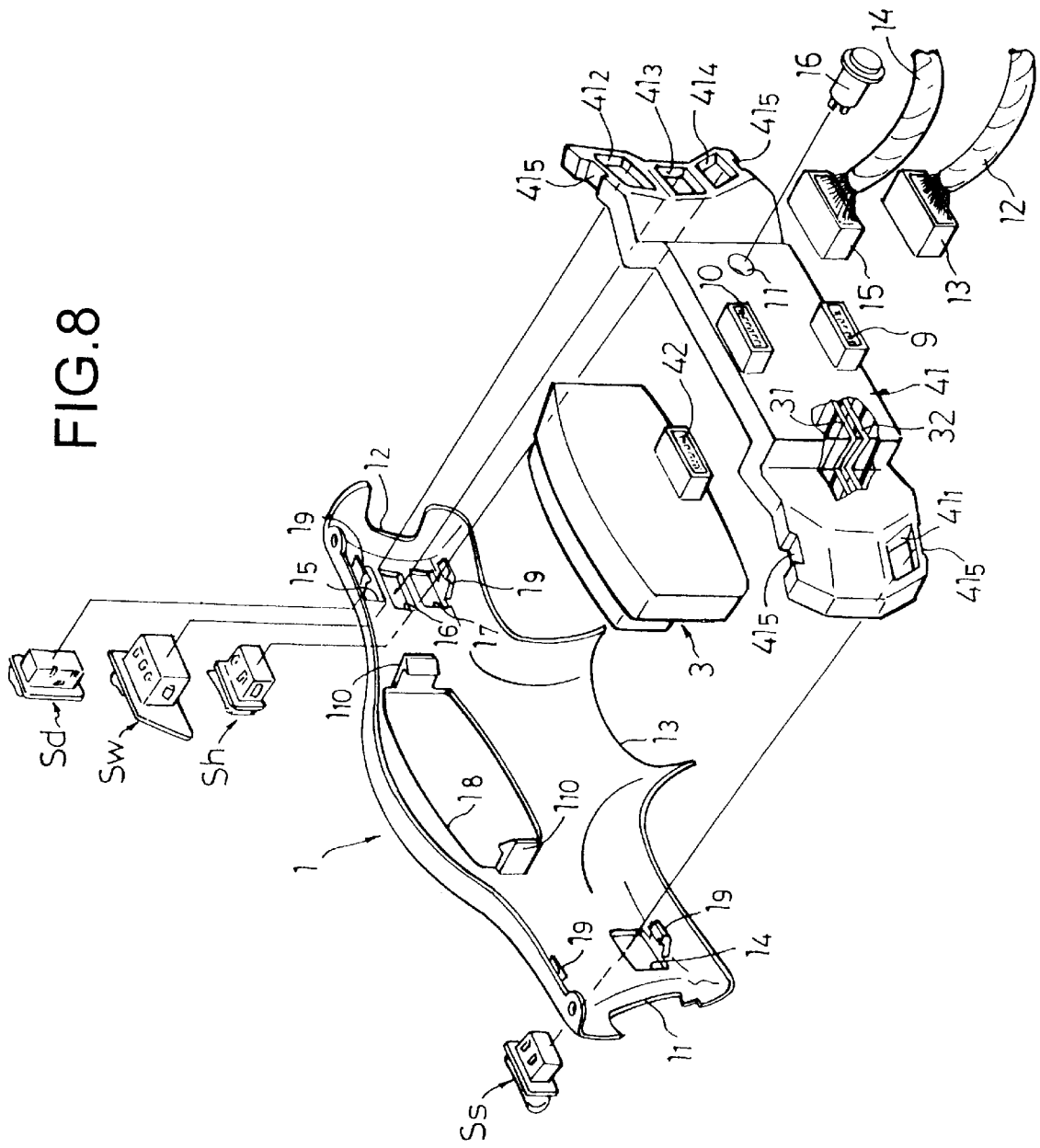
FIG. 8 is an exploded perspective view taken from the front of a rear handlebar cover in a motorcycle according to a second embodiment of the present invention.

A second embodiment of the present invention will now be described with reference to FIG. 8. In the second embodiment shown in FIG. 8, the same reference characters as those in the first embodiment are affixed to members, portions or components corresponding to those in the first embodiment.

The second embodiment includes a bus bar embedding substrate 41 made of a synthetic resin and locked and fixed with its four locking recesses $41_5$ locked in four locking claws $1_9$ projectingly provided on an inner surface of a rear handlebar cover 1. Nine bus bars 31 to 40 (only bus bars are shown) are integrally embedded in the bus bar embedding substrate 41. The bus bar embedding substrate 41 includes four openings $41_1$, $41_2$, $41_3$ and $41_4$ corresponding to the four openings $1_4$, $1_5$, $1_6$ and $1_7$ in the rear handlebar cover 1. The starter switch Ss, the dimmer switch Sd, the winker switch Sw and the horn switch Sh are passed through the openings $1_4$, $1_5$, $1_6$ and $1_7$ in the rear handlebar cover 1 and locked in the openings $41_1$, $41_2$, $41_3$ and $41_4$ in the bus bar embedding substrate 41, where the switches Ss, Sd, Sw and Sh are connected by the bus bars 31 to 40 in a structure similar to that in the first embodiment.

Further, the meter unit 3 fitted in the opening 18 defined at the center of the rear handlebar cover 1 and fixed by two locking claws $1_{10}$, $1_{10}$ is coupled to the bus bar embedding substrate 41 through a connector 42 mounted on a back of the meter unit 3. The connector 13 of the main harness 12, the connector 15 of the front handlebar cover 14 and the winker relay 16 are coupled to three connectors 9, 10 and 11 provided on the bus bar embedding substrate 41.

Thus, in addition to the operational effect of the first embodiment, the second embodiment can provide an operational effect which will be described below. Since the bus bars 31 to 40 are embedded in the bus bar embedding substrate 41 mounted to the rear handlebar cover 1, rather than being embedded directly in the rear handlebar cover 1, it is possible to simplify the structure of a die for producing the rear handlebar cover 1 by an injection molding to reduce the cost.

Although the embodiments of the present invention have been described in detail, it will be understood that the present invention is not limited to the above-described embodiments, and various modifications in design may be made without departing from the spirit and scope of the invention defined in claims.

For example, the conductor may be formed of a usual wire harness in place of being formed each of the bus bars 31 to 40. In this case, it is necessary to provided the switch support with a terminal to which the end of the wire harness is connected, in place of each of the terminals $31_1$, $32_1$ of the bus bars 31 to 40. In addition, the terminals $24_2$ and $25_2$ of the stationary contacts 24 and 25 have the resilience in the embodiments, but the terminals $31_1$ and $32_1$ of the bus bars 31 to 40 may be provided with a resilience. The locking claws $21_2$, $21_2$ for fixing the switch housing 21 to the rear handlebar cover 1 are provided on the switch housing 21 in the embodiments, but the locking claws may be provided on the rear handlebar cover 1. Further, the present invention is applicable to a switch used in any application.

What is claimed is:

1. A switch mounting structure in which a plurality of switches are mounted, the switch mounting structure is used on a two-wheeled motor vehicle having a handlebar and a steering shaft, comprising:

a handlebar cover covering said handlebar and having a plurality of notches and an opening defined within the handlebar cover, the handlebar and steering shaft passing through the notches;

a connection device is provided on said handlebar cover and connected to said switches via bus bars embedded in said handlebar cover to provide connection of said switches to an external power source;

at least one of said switches having a switch housing, a stationary contact provided on the switch housing, and a movable contact which is provided on the switch housing and can be placed in contact with said stationary contact, wherein a terminal of the one switch is connected to said stationary contact and is electrically connectable to a terminal of one of said bus bars rigidly mounted on the handlebar cover, wherein the terminal of the bus bar has an end exposed to the opening in the handlebar cover; and said switch housing has at least one locking claw extending from a side of the switch housing, and wherein when the switch housing is inserted into the opening defined in said handlebar cover, the switch housing is locked therein by the at least one locking claw and the terminal of said switch resiliently abuts the terminal of said bus bar, thereby completing the electrical connection of the switch to the bus bar.

2. A switch mounted structure according to claim 1, wherein the motor vehicle is a motorcycle.

3. A switch mounting structure in which a plurality of switches are mounted, the switch mounting structure is used on a two-wheeled motor vehicle having a handlebar and a steering shaft, comprising:

a bus bar-embedded substrate having a plurality of notches and an opening defined within the substrate, the handlebar and steering shaft passing through the notches;

a connection device is provided on said bus bar-embedded substrate and connected to said switches via bus bars embedded in said substrate to provide connection of said switches to an external power source;

at least one of said switches having a switch housing, a stationary contact provided on the switch housing, and a movable contact which is provided on the switch housing and can be placed in contact with said stationary contact, wherein a terminal of the one switch is connected to said stationary contact and is electrically connectable to a terminal of one of said bus bars rigidly mounted on the substrate, wherein and the terminal of the bus bar has an end exposed to the opening in the substrate; and said switch housing has at least one locking claw extending from a side of the switch housing, and wherein when the switch housing is inserted into the opening defined in said substrate, the switch housing is locked therein by the at least one locking claw and the terminal of said switch resiliently abuts the terminal of said bus bar, thereby completing the electrical connection of the switch to the bus bar.

* * * * *